United States Patent [19]
Blawert et al.

[11] 4,237,988
[45] Dec. 9, 1980

[54] OVERLOAD PROTECTION DEVICE FOR A TOP PAN PRECISION SCALE

[75] Inventors: Dieter Blawert, Göttingen; Karl-Heinz Rademacher; Erich Knothe, both of Bovenden; Franz J. Melcher, Hardegsen, all of Fed. Rep. of Germany

[73] Assignee: Sartorius GmbH

[21] Appl. No.: 49,552

[22] Filed: Jun. 18, 1979

[30] Foreign Application Priority Data

Jun. 20, 1978 [DE] Fed. Rep. of Germany ... 7818416[U]

[51] Int. Cl.³ ............................................. G01G 21/22
[52] U.S. Cl. ..................................... 177/189; 177/156
[58] Field of Search ................ 177/156, 155, 154, 153, 177/189, 187, 212

[56] References Cited

U.S. PATENT DOCUMENTS

| | | | |
|---|---|---|---|
| 1,858,795 | 5/1932 | Van Duyn | 177/189 |
| 3,973,637 | 8/1976 | Kunz | 177/189 |
| 4,136,750 | 1/1979 | Strickler | 177/189 |

Primary Examiner—Joseph W. Hartary
Attorney, Agent, or Firm—Otto John Munz

[57] ABSTRACT

An overload protection device for a top pan precision scale having a weighing pan support and a support plate carried by a load support mounted for limited movement and connected to an indicator, includes a spring engaged between the weighing pan support and the support plate whereby the weighing pan support is resiliently coupled to the load support, and a plurality of overlapping elements carried by the weighing pan support and extending beyond the outer peripheral edge of the support plate in close proximity thereto so that the weighing pan support and support plate are held in assembled relationship against the bias of the spring by the overlapping elements at the outer peripheral edge of the support plate, whereby upon eccentric loading of the scale, the pivot point of the weighing pan support is extended to the side of the weighing pan support opposite the load, and the lever translation thus effected results in a lower load on the load support than the highest available load.

13 Claims, 4 Drawing Figures

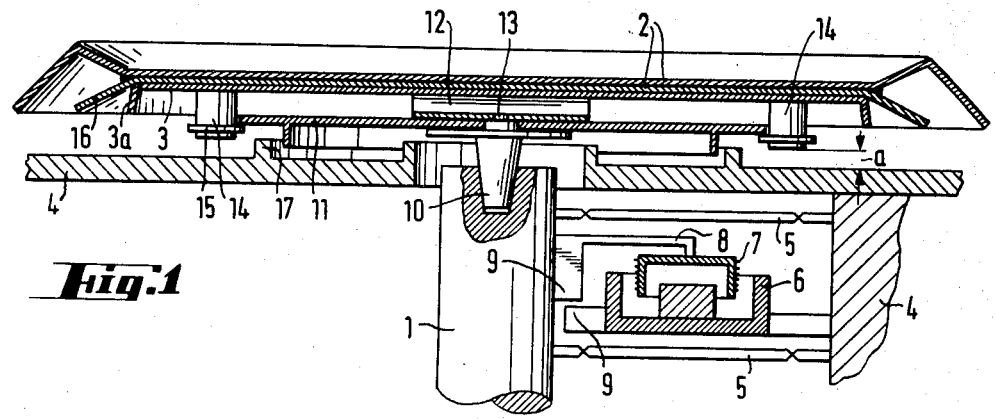
Fig. 1
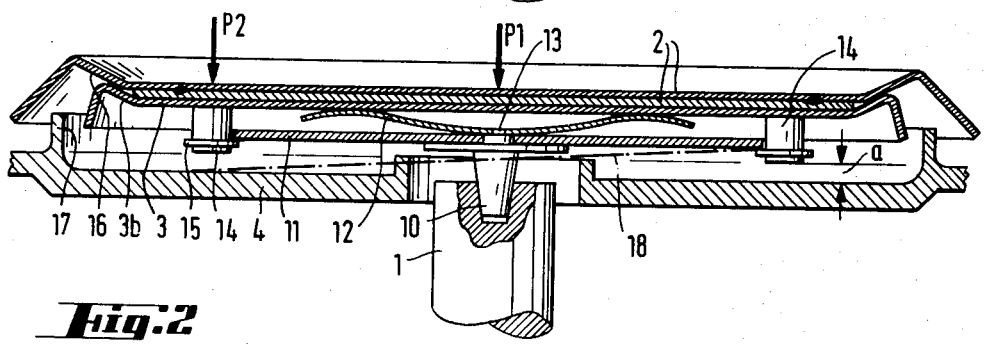
Fig. 2
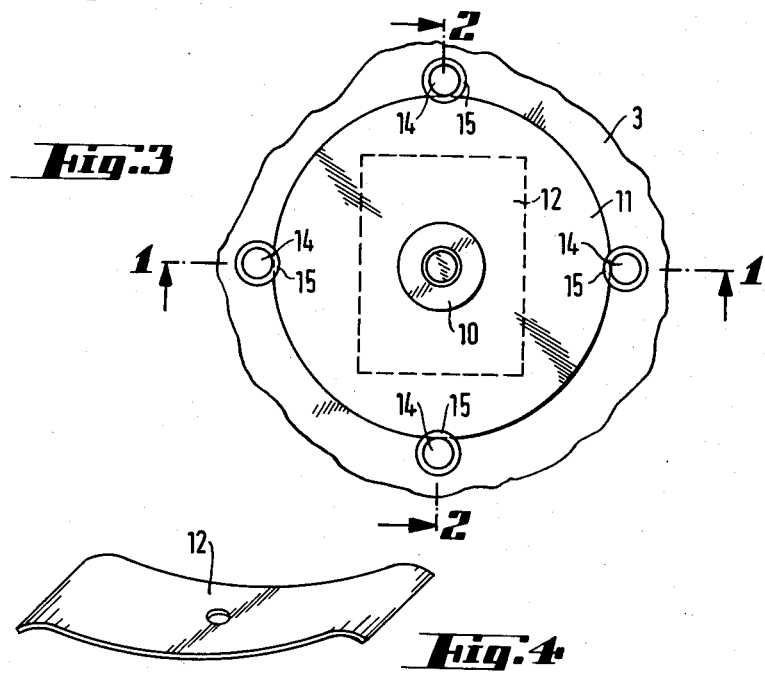
Fig. 3
Fig. 4

OVERLOAD PROTECTION DEVICE FOR A TOP PAN PRECISION SCALE

BACKGROUND OF THE INVENTION

The invention relates to an overload protection device for a top pan precision scale, the weighing pan of which is arranged on a load support with limited movement, and wherein an elastic component is arranged between the weighing pan or weighing pan support and the load support, the resilient path of the elastic component being greater in the direction of the movement of the load support than the free path of the weighing pan up to a stop in the housing.

This type of top pan precision scale typically operates mechanically with the aid of a lever arrangement and movable sets of weights, or electromechanically, wherein a transducer operates according to the electromagnetic force compensation principle. In all cases, the load support carrying the weighing pan undergoes a vertical movement of a few millimeters or tenths of millimeters before coming to rest on a stop in the housing provided to protect the scale components from overload. This type of load occurs, for example, if loads are improperly placed too hard on the weighing pan, too close to the peripheral area, or are otherwise improperly positioned.

PRIOR ART

In a known overload protection device of the abovedescribed construction (U.S. Pat. No. 3,973,637) a starshaped spring is employed, being arranged between the weighing pan and the load support. This resilient structural component of leaf spring arms arranged about the support pin of the weighing pan to form a star does not demonstrate the desired results for eliminating overloads placed in the center of the weighing pan. If a load is placed eccentrically, each star finger must be able to assume the full possible load, and the centrally disposeded load thereby increases almost according to the number of star fingers.

SUMMARY OF THE INVENTION

The basic objective of the invention is therefore to further develop an overload protection device according to the above with simple means arranged in such a manner that both centrally and peripherally disposed loads on the weighing pan, as well as similarly acting shocks thereto, are perfectly cushioned and not transferred into the system, and that the maximum load difference between eccentric and concentric loads is about 1:2.

This objective is achieved according to the invention in that the weighing pan support has a support plate for the load pan support pin which is supported on the load support, which support plate is spaced from and disposed basically parallel to the underside of the weighing pan support, and that in the free space between the underside of the weighing pan support and the upper side of the support plate a spring element is engaged, by means of which the weighing pan support is resiliently supported to a limited degree opposite the support plate by overlapping elements of the weighing pan support which engage the outer edge of the support plate.

Further objects and advantages will be apparent from the following description and claims.

BRIEF DESCRIPTION OF THE DRAWINGS

FIG. 1 is a vertical section taken along line 1—1 in FIG. 3;

FIG. 2 is a vertical section taken through a plane at a right angle to the section of FIG. 1, showing a modified form of the invention;

FIG. 3 is a bottom view in reduced dimension of the weighing pan support; and

FIG. 4 is a perspective illustration of the spring element.

DETAILED DESCRIPTION OF THE PREFERRED EMBODIMENT

The overload protection device is employed in the present example in a top pan precision scale with electromagnetic load compensation. The load support 1 is vertically guided on rigid points of the housing 4 with the aid of parallel guide 5, namely in an area determined by the stops 9. The vertical path of the load support 1 is thus only a few tenths of a millimeter. The electromagnetic load compensation takes place in a customary manner with the aid of a coil holder 8 with coil 7, which passes into the free space of a rigidly arranged permanent magnet 6.

The load support 1 passes without contact through an opening in the cover of the housing 4, which, with the aid of annular, upstanding ribs 17 or the like, together with the weighing pan 2, forms a type of labyrinth seal. The end of the load support 1 serves to support the weighing pan support pin 10.

The weighing pan 2 is in the form of a plate or dish and lies loosely on the weighing pan support 3, which in turn is supported on a spaced, parallel support plate 11 by means of a spring element 12 in the form of a prebiased leaf spring engaged in the free space between the underside of the weighing pan support 3 and the upper side of the support plate 11. The leaf spring 12 is nonshiftably secured by the centering device 13 on the end of the support pin 10 or the support plate 11.

Distributed about the periphery of the weighing pan support 3 are a plurality of overlapping elements in the form of pins 14 and pin plates 15 which extend downwardly beyond the outer edge of support plate 11, thereby producing a connection between the weighing pan support 3 and support plate 11, which connection is subject to the pre-biasing of the leaf spring 12.

As can be seen from FIG. 2 and FIG. 4, the free ends of the leaf spring 12 are truncated and formed as guide surfaces which allow a deflection of the spring ends on the underside of the weighing pan support 3 when loaded.

As can be seen from FIG. 1, the maximum spring path is designated with a and is defined by the distance of the pins 14 from the upper side of the housing 4.

If, for example, a load P1, which is higher than the sacle range, is appropriately placed on the weighing pan 2, then the leaf spring 12 is compressed under this load, so that the pins 14 rest on the housing 4 before overload detrimental to the weighing system can be transferred into the mechanical works or the load support 1.

The same effect occurs if an allowable load is placed too hard onto the weighing pan 2 because of improper handling, thereby producing shock loads larger than the highest allowable load. With a centered load, the weighing pan 2, support plate 11 and leaf spring 12 act like a type of parallel guide, so that all pins 14 rest on the housing 4. If a load P2 is improperly eccentrically loaded onto the weighing pan 2, the rotational point of the weighing pan support 3 is extended by the tipping, as indicated by line 18 in FIG. 2, to the diametrically opposite edge area of the support plate 11, so that because of the lever translation a lower load than the highest allowable is sufficient to effect the overload protection. In this case, on one side the pin 14 lying under the load P2 rests on the housing 4 without damaging loads being transferred through the support pin 10 into the system.

In a non-illustrated embodiment, in place of pins 14, the lower outer edge of the weighing pan support 3 rests directly on the housing 4 when there is an overload.

To cushion lateral shock loads aginst the weighing pan 2, the weighing pan support 3 in each form of the invention has a rounded edge 3a, which is overlapped by angular surfaces 16 of the weighing pan 2, so that the weighing pan can deflect in the direction of the shock under the effects of lateral shocks, without these shocks passing through the weighing pan support 3 and thereby into the system.

The arrangement of FIG. 1 is further protected from damage due to lateral shock, because of the arrangement of rib 17 in housing 4 and rib or flange 19 on support plate 11, which ribs engage one another upon the occurence of a lateral shock, to thereby limit lateral movement of the support plate 11 and enable weighing pan 2 to separate from weighing pan support 3.

Similarly, in the embodiment according to FIG. 2, a depressed area of the housing 4 surrounds the weighing pan support 3', and the rib 17' surrounds the depressed area 3b, so that only the outer edge of the weighing pan 2 overlaps the rib 17', and the outer edge of weighing pan support 3' is arranged to engage the flange 17' upon the occurence of a lateral shock to weighing pan 2, to thus limit lateral movement of the weighing pan supprt 3', and enable the weighing pan to separate from the weighing pan support.

The path of the load support in such electromagnetic compensating scales is only a few tenths of a millimeter, while in mechanical scales it can lie in the range of 4–10 mm. In both cases, the principle of the described overload protection is effective. By proper selection of the spring 12 the overload protection can be adjusted to the scale-specific overloads of the individual scale types.

What is claimed is :

1. In an overload protection device for a top pan precision scale, wherein the weighing pan is arranged on a load support mounted for limited movement on a housing, limit stops are provided for limiting movement of the weighing pan, and an elastic component is arranged between the weighing pan and the load support, the resilient travel of which is larger in the direction of movement of the load support than the free travel of the weighing pan as defined by the limit stops, the improvement comprising:

a weighing pan support for supporting the weighing pan, a support plate supported on the load support and extending basically parallel to and spaced from the weighing pan support defining a free space therebetween, asid elastic component being arranged in the free space between the underside of the weighing pan support and the upper side of the support plate, so that the weighing pan support is supported in a limited resilient manner opposite the support plate, and overlapping elements connected to the weighing pan support and extending downwardly in close proximity beyond the outer edge of the support plate, said overlapping elements holding the weighing pan support and support plate together against the bias of the elastic component.

2. An overload protection device as claimed in claim 1, wherein the overlapping elements comprise pins projecting from the underside of the weighing pan support.

3. An overload protection device as claimed in claim 2, wherein a plurality of overlapping elements are uniformly distributed about the periphery of the support plate.

4. An overload protection device as claimed in claim 3, wherein the elastic component comprises at least one leaf spring.

5. An overload protection device as claimed in claim 4, wherein said leaf spring is formed as a curved, prebiased spring.

6. An overload protection device as claimed in claim 5, wherein the support plate is supported on a support pin, and the leaf spring is located concentrically to the support pin and is secured on the underside of the weighing pan support.

7. An overload protection device as claimed in claim 6, wherein the support plate is supported on a support pin, and the leaf spring is located concentrically to the support pin and is secured on the upper side of the support plate.

8. An overload protection device as claimed in claim 1, wherein the pins formed as overlapping elements are widened on their free ends, whereby the widened portion overlaps the edge of the support plate.

9. An overload protection device as claimed in claim 8, wherein the overlapping elements are supported on stops in the housing in the tipped condition of the weighing pan support.

10. An overload protection device as claimed in claim 9, wherein the outer edge of the weighing pan support is supported on stops in the housing.

11. An overload protection device as claimed in claim 10, wherein the weighing pan support and the support plate are circular.

12. An overload protection device as claimed in claim 11, wherein the weighing pan support has a rounded upper edge overlapped by angular surfaces of the weighing pan, with which angular surfaces the weighing pan is guided in a direction to enable separation of the weighing pan support from the weighing pan when there is a lateral shock to the weighing pan.

13. An overload protection device as claimed in claim 12, wherein the weighing pan support ends almost flush with the peripheral upper edge of the housing.

* * * * *